United States Patent [19] [11] 3,745,944
Yetter et al. [45] July 17, 1973

[54] COMBINED LIQUID FERTILIZER DISPENSER AND SOIL COMPACTING AND SEALING DEVICE FOR CULTIVATORS

[76] Inventors: Harry G. Yetter, Colchester;
Herbert Baughman, RFD, Vermont, both of Ill.

[22] Filed: Aug. 30, 1971

[21] Appl. No.: 175,859

[52] U.S. Cl. .................................. 111/7, 172/657
[51] Int. Cl. ............................................. A01c 23/02
[58] Field of Search ............................... 111/6, 7, 85

[56] References Cited
UNITED STATES PATENTS

| 3,384,039 | 5/1968 | Ratliff | 111/7 |
| 2,781,733 | 2/1957 | Graham | 111/7 |
| 1,030,244 | 6/1912 | Payne | 111/85 |
| 3,621,800 | 11/1971 | Rellinger | 111/7 |

Primary Examiner—Robert E. Pulfrey
Assistant Examiner—Stephen C. Pellegrino
Attorney—Thomas F. McWilliams

[57] ABSTRACT

A combined liquid fertilizer dispensing and soil compacting device for cultivators as for example, chisel plows, shovel plows, etc., wherein liquid nitrogenous fertilizer, i.e., anhydrous ammonia is supplied from a suitable source to and flowed through tubing secured and extending longitudinally of and along the trailing side of an earth-working chisel or shovel plow carrying shank to a depth below that of the soil surface level being cultivated where it is anchored thereto and discharged thereinto and diffused therethrough thus fertilizing the tilled soil which is thereupon firmly compacted and sealed by means of a shank pivotally connected and drawn member, thus preventing the loss of its efficacy by osmosis and evaporation.

7 Claims, 4 Drawing Figures

PATENTED JUL 17 1973      3,745,944
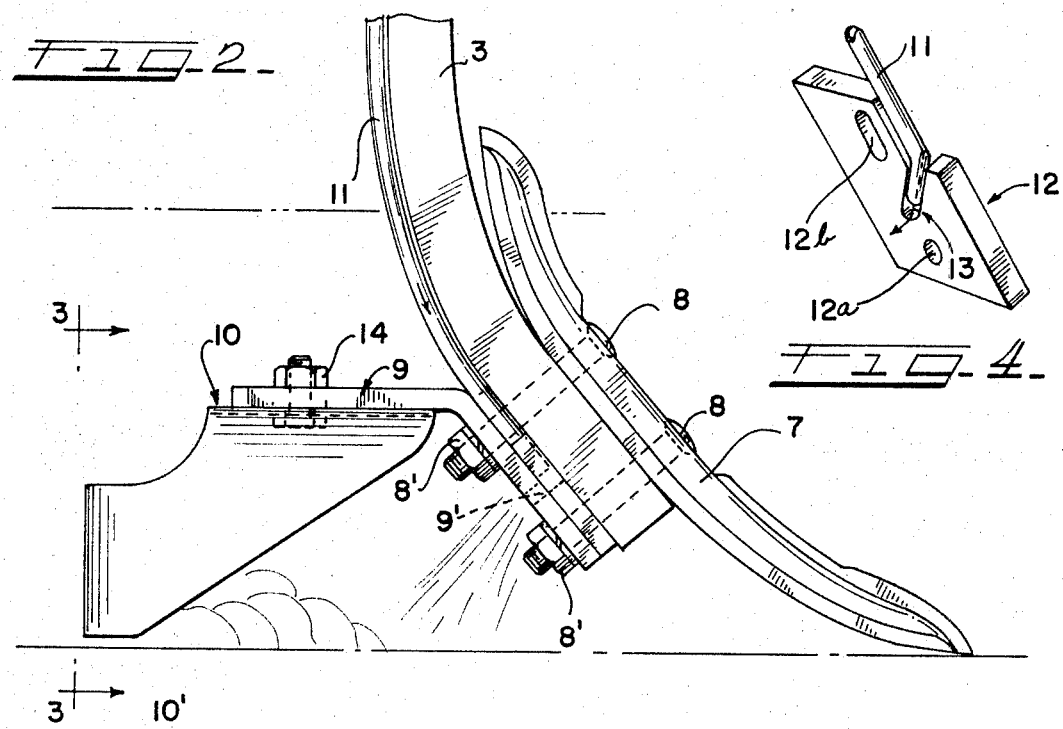
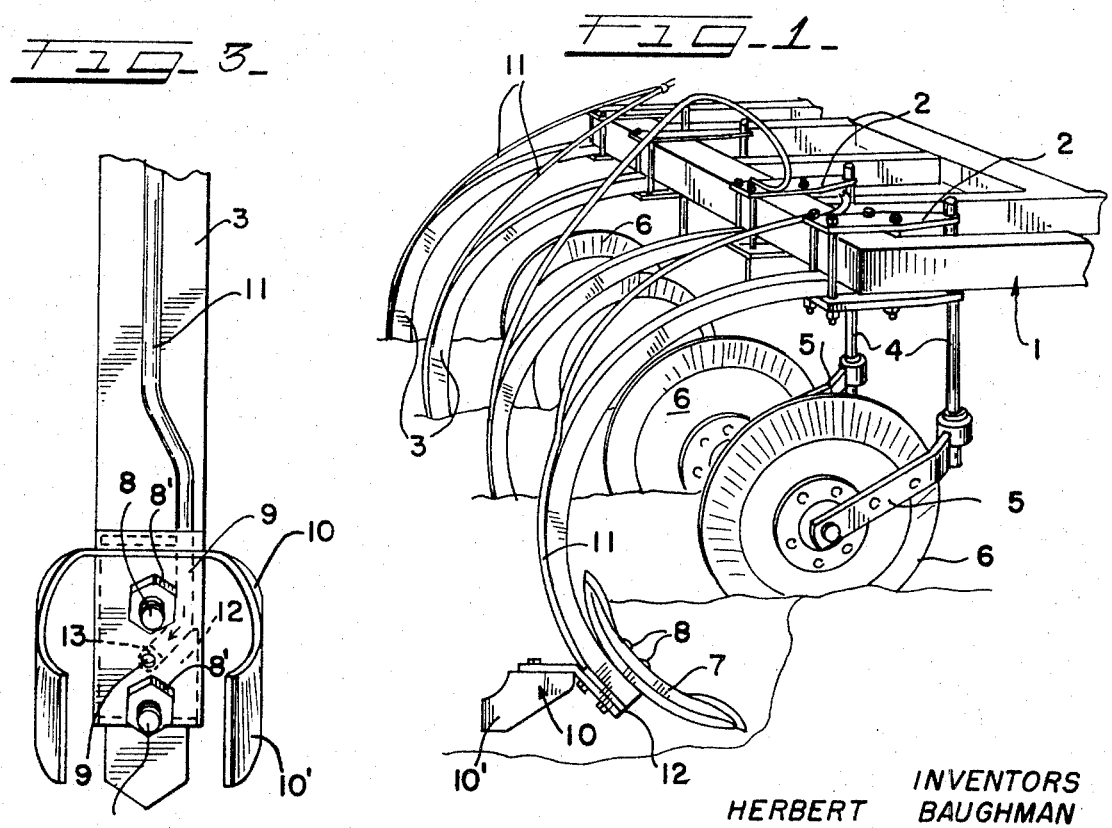
INVENTORS
HERBERT BAUGHMAN
HARRY G. YETTER
BY Thomas F. McWilliams
ATT'Y

COMBINED LIQUID FERTILIZER DISPENSER AND SOIL COMPACTING AND SEALING DEVICE FOR CULTIVATORS

This invention generally relates to the field of earth-working and cultivation (agricultural), particularly to devices for fertilizing field soils concurrently with cultivation thereof whereby to enrich and render the same beneficially productive in and for the growth of vegetation, this with the minimum loss of the employed or dispensed fertilizing materials and maximum economies.

BACKGROUND OF THE INVENTION

The basic aspiration underlying agricultural development is the production of more and better crops. To and for the accomplishment of such, soil fertilization by the use of soil nutrients containing chemicals and applying equipment have been developed and used. Insofar as we are aware, the employed equipment suffer from certain disadvantages, the most important of which is the difficulty in controlling the supply of liquid medium fertilizers to the soil in a manner which will assure the attainment of full benefits therefrom with maximum economies, this to the extent that loss of the applied materials by faulty dispensing on and into the soil and their loss through rapid and costly evaporation occurs.

In view of this background of the art and the need for advance, briefly touched on above, it is accordingly an object of our invention to provide a corrective and practical liquid fertilizer dispenser and soil treating equipment.

A further object of the invention is to provide a liquid fertilizer dispensing device which is mountable on the earth-working member carrying shank in trailing and working relation thereto, i.e., a cultivator shovel or chisel, without structural or design alteration or modification thereof.

A further object of the invention is to provide a liquid fertilizer dispensing device of such design, construction and mounting on the carrying shank that it will accurately follow the path of travel of the earth-working member and the tilled loose earth furrow or row effected thereby during its travel, thus, assuring a complete discharge and deposit of the employed fertilizer thereon and therein, as and when the equipped cultivator is cornered or turned during cultivating usage.

A still further object of the invention is to provide for and effect the firm compacting of the earth-working member cultivated loose earth or soil furrows substantially concurrently with the discharge and reception of liquid fertilizer therein and thereon, whereby to seal the same and prevent its escape and loss by osmosis and/or evaporation.

Further advantages and objects of the invention will be in part obvious and in part hereinafter pointed out with reference to the accompanying drawings in which:

FIG. 1 is a fragmentary perspective of the rearward part of a multiple shovel type of cultivator whose shovel plows are equipped with the invention shown in FIG. 2;

FIG. 2 is a side elevation of the lower portion of the supporting shank of a shovel plow or other appropriate form of earth-working device equipped with the invention;

FIG. 3 is a fragmental elevation of the open rear or trailing end portion of the cultivator earth or soil compacting shoe mounted in trailing relation to and on the lower end portion of the shovel plow carrying shank plus a portion of the liquid fertilizer conveying tube or tubing connected thereto in effective dispensing relation, and;

FIG. 4 is a detailed perspective of the liquid fertilizer ejector block or plate which receives the open lower end portion of said fertilizer conveying tubing engaged therein.

Referring now to the drawings, and to FIG. 1 in particular, the invention is shown provided to a multiple shovel type of cultivator generally including a body frame 1 the rear end beam portion of which has appropriate clamping or securing brackets 2 thereon each securing and supporting a rearwardly disposed conventional form of curved shank 3, and a vertically positioned rod 4 rotatably mounting a bracket arm 5 on its lower portion which in turn rotatably mounts the conventional form of colter 6.

A shovel plow 7, or its equivalent or chisel plow is fixedly mounted on the lower end portion of each shank 3 (there being a plurality of these as shown in the drawing FIG. 1) by connecting bolts 8 engaged through lower ends thereof (FIGS. 1 and 2), serving also to fixedly mount and receive the angled portion of a support bracket 9 for the cultivated earth or soil compacting and sealing shoe 10 said portion having a liquid fertilizer discharge port 9' therein, both hereinafter more fully described.

A liquid fertilizer conveying and dispensing tube 11 is connected to a suitable source of supply (not shown) and extends therefrom to and downwardly along and adjacent the rear or trailing side of each of the shanks 3, to a point in proximity to the lower ends thereof where its open free end portion is received in and effectually anchored in and by a liquid fertilizer ejector block or plate 12. This block or plate, as shown in FIG. 4, consists of a substantially rectangularly shaped body (preferably metal) of width corresponding to that of its receiving shank and is formed with spaced openings 12a and 12b for receiving the connecting bolts 8 therethrough. An obliquely disposed outwardly opening slot 13 is formed in the plate and receives therein the open free or discharge end portion of the tube in spaced relation to its inner end, such space being aligned and communicating with the discharge port 9' in the angled portion of the support bracket 9 in order that fertilizer liquid delivered from the tube 11 can be outwardly and downwardly discharged. As hereinbefore stated, the angled portion of the shoe 10, support bracket 9 overlies the shank engaged ejector plate 12 receiving the extended end portions of the connecting bolts 8 through the openings 12a and 12b therein and therethrough as well as said bracket angled portion, having locking and clamping securing nuts 8' threadably engaged for an obvious purpose.

The extended and remaining portion of the support bracket 9, as shown in FIG. 2, is horizontal and trailing the shank 3 in overlying relation to the top of the soil compacting and sealing shoe 10 and rotatably or pivotally connected thereto by a preferably shouldered bolt 14. Thus the shoe is freely rotatable on the support bracket horizontal portion whereby with turning or cornering of the equipped cultivator during a cultivating and fertilizing operation it will automatically follow and maintain overlying alignment with the In order that this treated soil row will be compacted, the shoe 10 is preferably formed of one piece of metal or other suitable material of substantially inverted U-shape formation with complementary sized and shaped trailing wings or walls, as will be noted upon reference to FIG. 3, are bent or formed inwardly, i.e., they converge, whereas the normally forward portion of the shoe is wider than the normally rearward open portion thereof, that is, the spacing between the rearward or outer ends of the trailing wings or walls 10' is narrower. Hence, as the soil is tilled, the trailing loose earth will enter the open forward end of the shoe 10, be over-ridden by and concurrently compacted as the shoe continues to travel thereover and therealong, compacting it by reason of its engagement between the converging shoe wing 10' to such a density that the liquid fertilizer deposited thereinto and thereon from the tube 11 and ejector plate 12 will be sealed in a manner entirely sufficient to prevent its loss or waste as by osmosis and/or evaporation.

In consequence, materially advantageous benefits and economies will be effected.

From a reading of the foregoing description of the invention, it is believed that its use, operation and advance in the art to which it is related, will be understood. However, and briefly, during travel of a cultivator equipped therewith over a field being cultivated, a liquid fertilizer such as anhydrous ammonia from a preferably mobile source (not shown) is collectively supplied under pressure (if desired) to the tubes 11 carried on the shanks of the shovel plows or other soil cultivating members. It is flowed downwardly therethrough and discharged from the lower ends of the tubes and the ejector plates 12 via the discharge ports 9' in the manner indicated in FIG. 2 of the drawings into and onto the cultivated lines or rows of loosened and tilled soil. As the travel of the cultivator continues the trailing earth compacting and sealing shoes 10 connected to the shanks 3 override the lines or rows of tilled soil compacting the same between the shoe side walls and their convergent wings 10' and to such an extent as will effectually seal the same thereby assuring the attainment of full benefits of the fertilization in that escape and loss of the liquid fertilizer as by evaporation etc. will be prevented, or if not this, then reduced to an absolute minimum.

The invention may be embodied in other specific forms without departing from the essential characteristics thereof. The present embodiment is therefore to be considered in all respects as illustrative and not restrictive, the scope of the invention being indicated and established by the appended claims rather than by the foregoing description, and all changes which come within the meaning and range of equivalency of the claims are therefore intended to be embraced therein.

We claim:

1. A combined liquid fertilizer dispenser and soil and sealing device for cultivators, comprising:
   (a) a liquid conveying tubing disposed longitudinally and dowardly of the rearward side of the supporting shank of the cultivator earth-working means and connected thereto;
   (b) an ejector plate having an inwardly disposed slot therein receiving the lower end portion of the tubing connected to said shank and communicating with a fluid discharge way therein;
   (c) a soil compacting and sealing means supportingly connected to the lower end portion of this shank directly trailing the same, the earth-working means and the ejector plate;
   (d) said compacting and sealing means having an angled supporting portion overlying said ejector plate and having a discharge port through said supporting portion communicating with said fluid discharge way; and
   (e) means securing said earth-working means at the front side of said shank and said ejector plate and angled supporting portion at the rear side of the shank.

2. The structure of claim 1 characterized in that the plate has an inwardly disposed way therein communicating with a fluid discharge way and receives the open lower end portion of the tubing therein.

3. The structure of claim 1 further characterized in that the plate is secured to the lower end portion of the cultivator shank.

4. The structure of claim 1 further characterized in that the soil compacting and sealing means is freely rotatably supported by and from the cultivator shank in trailing relation thereto.

5. The structure of claim 1 further characterized in that a bracket arm is fixedly mounted on the lower end portion of the shank and has a substantially horizontally rearwardly disposed and trailing portion, and the soil compacting and sealing means is freely rotatable through a substantially horizontal plane and supported thereon.

6. The structure of claim 5 characterized in that the soil compacting and sealing means comprises a substantially inverted cross-sectionally U-shaped body open at both ends and the said side walls thereof rearwardly converge.

7. The structure of claim 6 characterized in that the soil compacting and sealing member is of substantially inverted U-shaped cross-sectional form freely rotatably supported through a substantially horizontal plane on a lower portion of the cultivator shovel carrying shank and trailing the same.

* * * * *